(12) United States Patent
Zhao (10) Patent No.: US 11,997,015 B2
(45) Date of Patent: May 28, 2024

(54) ROUTE UPDATING METHOD AND USER CLUSTER

(71) Applicants: BEIJING KINGSOFT CLOUD NETWORK TECHNOLOGY CO., LTD., Beijing (CN); BEIJING KINGSOFT CLOUD TECHNOLOGY CO., LTD., Beijing (CN)

(72) Inventor: Qi Zhao, Beijing (CN)

(73) Assignees: BEIJING KINGSOFT CLOUD NETWORK TECHNOLOGY CO., LTD., Beijing (CN); BEIJING KINGSOFT CLOUD TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/642,031

(22) PCT Filed: Nov. 20, 2020

(86) PCT No.: PCT/CN2020/130375
§ 371 (c)(1),
(2) Date: Mar. 10, 2022

(87) PCT Pub. No.: WO2021/098819
PCT Pub. Date: May 27, 2021

(65) Prior Publication Data
US 2024/0048484 A1    Feb. 8, 2024

(30) Foreign Application Priority Data
Nov. 22, 2019    (CN) .......................... 201911159284.8

(51) Int. Cl.
*H04L 45/745*    (2022.01)
*H04L 45/02*    (2022.01)

(52) U.S. Cl.
CPC ............ *H04L 45/745* (2013.01); *H04L 45/04* (2013.01)

(58) Field of Classification Search
CPC .............................. H04L 45/745; H04L 45/04
See application file for complete search history.

(56) References Cited

U.S. PATENT DOCUMENTS

| | | | |
|---|---|---|---|
| 10,290,004 B1 * | 5/2019 | Conboy | G06Q 30/0635 |
| 2018/0013636 A1 * | 1/2018 | Seetharamaiah | G06F 9/5077 |

(Continued)

FOREIGN PATENT DOCUMENTS

| | | |
|---|---|---|
| CN | 103532839 | 1/2014 |
| CN | 107528779 | 12/2017 |

(Continued)

OTHER PUBLICATIONS

International Search Report and Written Opinion issued in Corresponding Application No. PCT/CN2020/130375, dated Jan. 27, 2021 (English Translation provided).

(Continued)

*Primary Examiner* — William G Trost, IV
*Assistant Examiner* — Monishwar Mohan
(74) *Attorney, Agent, or Firm* — NORTON ROSE FULBRIGHT US LLP (57) ABSTRACT

A route updating method and a user cluster is disclosed. A master node of the user cluster operates in a worker node of a cluster provided by a service provider. The user cluster includes at least one worker node in which a BGP routing client operates, a BGP routing server operates in the master node, a BGP connection exists between the BGP routing client and the BGP routing server. When the BGP routing client detects that a new component is created by a worker node, the BGP routing client sends a route adding request corresponding to the component to the BGP routing server.

(Continued)

S101 — when the Border Gateway Protocol routing client detects that a new component is created by a worker node where the Border Gateway Protocol routing client is located, the Border Gateway Protocol routing client sends a route adding request corresponding to the component to the Border Gateway Protocol routing server S102 — when the route adding request is received, the Border Gateway Protocol routing server adds a route table entry including the IP address of the component and the IP address of the worker node where the Border Gateway Protocol routing client is located to a local route table of the master node When received, the BGP routing server adds a route table entry including the IP address of the component and the IP address of the worker node where the BGP routing client is located to a local route table of the master node.

11 Claims, 2 Drawing Sheets

(56) References Cited

U.S. PATENT DOCUMENTS

| | | | | |
|---|---|---|---|---|
| 2018/0323891 A1* | 11/2018 | Dubey | ................... | H04L 45/02 |
| 2019/0158537 A1* | 5/2019 | Miriyala | ............... | G06F 21/606 |

FOREIGN PATENT DOCUMENTS

| | | | | | |
|---|---|---|---|---|---|
| CN | 107770066 | | 3/2018 | | |
| CN | 107947961 | | 4/2018 | | |
| CN | 108549580 | | 9/2018 | | |
| CN | 108549580 A | * | 9/2018 | ............... | G06F 8/60 |
| CN | 109039790 | | 12/2018 | | |
| CN | 110012125 | | 7/2019 | | |
| CN | 110012125 A | * | 7/2019 | ........... | H04L 12/462 |
| CN | 110120916 | | 8/2019 | | |
| CN | 110120916 A | * | 8/2019 | ............. | H04L 12/66 |
| CN | 110266833 | | 9/2019 | | |
| CN | 110912827 | | 3/2020 | | |

OTHER PUBLICATIONS

*Kube-Router User Guide.* Kubernetes, 11 pages.

* cited by examiner

ROUTE UPDATING METHOD AND USER CLUSTER

CROSS REFERENCE TO RELATED APPLICATIONS

The present application is a national phase application under 35 U.S.C. § 371 of International Application No. PCT/CN2020/130375, filed Nov. 20, 2020, which claims the benefit of priority to Chinese patent application No. 201911159284.8, filed with the China National Intellectual Property Administration on Nov. 22, 2019 and entitled "Route Updating Method and User Cluster", each of which are incorporated herein by reference in their entirety.

TECHNICAL FIELD

The present application relates to the technical field of computer network, in particular to a route updating method and user cluster.

BACKGROUND

Kubernetes cluster, as a distributed architecture solution based on container technology, can not only save development costs, but also greatly reduce the difficulty and cost of the later operation and maintenance of the system because it provides a powerful automation mechanism. In related technologies, service provider can provide hosting service for user cluster based on Kubernetes cluster.

In the Kubernetes architecture, a master node of the user cluster can operate in a worker node of a cluster (which can be called the service cluster) provided by a cloud computing service provider (hereinafter referred to as the service provider). The master node of the user cluster can communicate with the worker node of the user cluster through a elastic network interface. Then, the service provider can use the master node of the user cluster operating in the worker node of the service cluster to manage multiple user clusters, thus reducing the complexity of managing multiple user clusters and improving management efficiency.

However, since the master node of the user cluster and the component in the worker node of the user cluster do not belong to the same network plane, which causes the master node of the user cluster to be unable to communicate with the component in the worker node of the user cluster.

SUMMARY

The purpose of the embodiments of the present application is to provide a route updating method and a user cluster, so that master node of the user cluster can communicate with component in worker node. The specific technical solutions are described below.

In the first aspect, in order to achieve the above purpose, an embodiment of the present application discloses a route updating method, which is applied to a user cluster, and the master node of the user cluster operates in a worker node of a cluster provided by a service provider. The user cluster further comprises at least one worker node, a Border Gateway Protocol BGP routing client operates in the worker node of the user cluster, while a BGP routing server operates in the master node, a BGP connection exists between the BGP routing client and the BGP routing server, and the method includes:

when the BGP routing client detects that a new component is created by a worker node where the BGP routing client is located, the BGP routing client sends a route adding request corresponding to the component to the BGP routing server, wherein route adding request carries an Internet Protocol IP address of the component and an IP address of the worker node where the BGP routing client is located;

when the route adding request is received, the BGP routing server adds a route table entry including the IP address of the component and the IP address of the worker node where the BGP routing client is located to a local route table of the master node.

In an embodiment, after the BGP routing client sends a route adding request corresponding to the component to the BGP routing server, the method further includes:

when the BGP routing client detects that the component is deleted by the worker node where the BGP routing client is located, the BGP routing client sends a route deleting request corresponding to the component to the BGP routing server, wherein the route deleting request carries the IP address of the component, and the IP address of the worker node where the BGP routing client is located; and when the route deleting request is received, the BGP routing server deletes the route table entry including the IP address of the component and the IP address of the worker node where the BGP routing client is located from the local route table of the master node.

In an embodiment, after the BGP routing client sends a route adding request corresponding to the component to the BGP routing server, the method further includes:

when the BGP routing client detects that the IP address of the component is modified by the worker node where the BGP routing client is located, the BGP routing client sends a route modifying request corresponding to the component to the BGP routing server, wherein the route modifying request carries the original IP address of the component before modification, a target IP address of the component after modification, and the IP address of the worker node where the BGP routing client is located; and when the route modifying request is received, the BGP routing server determines a route table entry including the original IP address and the IP address of the worker node where the BGP routing client is located based on the local route table of the master node, and modifies the original IP address in the determined route table entry to the target IP address.

In an embodiment, the master node is mounted with an elastic network interface, and the elastic network interface belongs to a virtual private cloud where the worker node of the user cluster is located;

The method further includes:

a component in the master node communicates with the component in the worker node of the user cluster through the elastic network interface based on the route table.

In an embodiment, the component includes a container group Pod component and a Service component.

In the second aspect, in order to achieve the above purpose, the embodiments of the present application also disclose a user cluster, a master node of the user cluster operates in a worker node of a cluster provided by a service provider, and the user cluster also includes at least one worker node, a Border Gateway Protocol BGP routing client operates in the worker node of the user cluster, a BGP routing server operates in the master node, and a BGP connection exists between the BGP routing client and the BGP routing server, wherein:

the BGP routing client is configured to send a route adding request corresponding to a new component to the BGP routing server when the BGP routing client detects that the component is created by the worker node where the BGP routing client is located, wherein the route adding request carries an Internet Protocol IP address of the component, and an IP address of the worker node where the BGP routing client is located; and the BGP routing server is configured to, when a route adding request is received, add a route table entry including the IP address of the component and the IP address of the worker node where the BGP routing client is located to a local route table of the master node.

In an embodiment, the BGP routing client is further configured to send a route deleting request corresponding to the component to the BGP routing server when detecting that the component is deleted by the worker node where the BGP routing client is located, wherein the route deleting request carries the IP address of the component and the IP address of the worker node where the BGP routing client is located; and the BGP routing server is further configured to, when the route deleting request is received, delete the route table entry including the IP address of the component and the IP address of the worker node where the BGP routing client is located from the local route table of the master node.

In an embodiment, the BGP routing client is further configured to send a route modifying request corresponding to the component to the BGP routing server when the BGP routing client detects that the IP address of the component is modified by the worker node where it is located, wherein the route modifying request carries the original IP address of the component before modification, a target IP address of the component after modification, and the IP address of the worker node where the BGP routing client is located; and the BGP routing server is further configured to, when the route modifying request is received, determine a route table entry including the original IP address and the worker node where the BGP routing client is located based on the local route table of the master node, and modify the original IP address in the determined route table entry to the target IP address.

In an embodiment, the master node is mounted with an elastic network interface, and the elastic network interface belongs to a virtual private cloud where the worker node of the user cluster is located, and component in the master node communicates with the component in the worker node of the user cluster through the elastic network interface based on the route table.

In an embodiment, the component includes a container group Pod component and a Service component.

In a third aspect, the present application provides a computer-readable storage medium having stored thereon a machine-executable instruction which, when called and executed by a processor, causes the processor to carry out that stores a computer program which, when executed by a processor, causes the processor to carry out any of the above route updating methods.

In the fourth aspect, the present application provides a computer program product including a instruction, which when executed by a computer, causes the computer to carry out any of the above route updating methods.

In the fifth aspect, the present application provides an executable program code, which is configured to carry out any one of the above route updating methods.

The embodiments of the present application provides a route updating method, which may be applied to a user cluster, a master node of the user cluster operates in s worker node of s cluster provided by s service provider, the user cluster further comprises at least one worker node, a BGP routing client operates in the worker node of the user cluster, a BGP routing server operates in the master node, a BGP connection between the BGP routing client and BGP routing server is established based on BGP network protocol. When it is detected that a new component is created by the worker node where the BGP routing client is located, the BGP routing client sends a route adding request corresponding to the component to the BGP routing server. When the route adding request is received, the BGP routing server adds a route table entry including the IP address of the component and the IP address of the worker node where the BGP routing client is located to a local route table of the master node.

Based on the above processing, the master node may obtain routing information of the component in the worker node from the local route table, and then can communicate with the component in the worker node according to the routing information of the component.

Certainly, it is not necessary for any product or method according to the present application to achieve all the above advantageous at the same time.

BRIEF DESCRIPTION OF THE DRAWINGS

In order to describe the technical solution of the embodiments of the present application and the prior art more clearly, drawings used in the embodiments and the prior art will be described briefly below. Obviously, the drawings described below are only for some embodiments of the present application, and those skilled in the art can obtain other drawings according to these drawings without any inventive efforts.

DETAILED DESCRIPTION

In order to make objectives, technical solutions and advantages of the present application more apparent, details of the present application will be described with reference to the accompanying drawings and by way of examples. Obviously, the embodiments described are only some of the embodiments of the present application instead of all of them. All other embodiments obtained by those of ordinary skills in the art based on the embodiments herein without any creative efforts are within the scope of the present application.

Cloud computing is a pay-per-use mode. In this mode, cloud computing service providers provide tenants (or users) with convenient, on-demand network access and configurable resource pools (including computing, storage, and network resources), and application system deployed in the resource pool by users can obtain computing power, storage space, and information services as required.

Kubernetes is a management platform for container clusters, referred to as K8S in the industry. A K8S system is usually called a K8S cluster. A K8S cluster includes multiple nodes (a node can be understood as a server, which can be a physical server or a virtual server). These nodes are divided into two types: master nodes and worker nodes. Multiple management and control components operate are operating on the master node, such as API Server (API: Application Programming Interface Server), Scheduler, Controller manager, etcd (a distributed consistent key-value storage system), etc. The master node can manage and control the worker node through these management and control components. A Container operates on the worker node, and the container is used for the workloads.

In the cloud computing mode, service providers provide users with a container cluster creation management platform, the user can easily build a Kubernetes cluster (hereinafter referred to as user cluster) by means of this platform. Since the cloud computing service providers usually provide services for multiple users through virtualization technology in the same resource pool, in order to achieve isolation among different users, the Kubernetes cluster created by the user usually operates in the network environment of the VPC of the user (Virtual Private Cloud). In this mode, if there is a problem in the user cluster, the user needs to authorize the key to the service provider, so that the operation and maintenance staff of the service provider can log in to the VPC of the user by the encryption and decryption of the key to operate to solve the problem. It is conceivable that when the number of users is large, the complexity of user management will gradually increase, and the labor cost and time cost will also increase.

In order to reduce the complexity of user management, related technologies have provided container cluster hosting services including: the master node in the user cluster is deployed in the VPC of service provider, and the master node in the VPC of the service provider can communicate with the worker node deployed in the VPC of the user by means of an elastic network interface. However, in this communication mode, since the master node of the user cluster and components in the worker node of the user cluster do not belong to the same network plane, that is to say, a packet sent by the master node of the user cluster cannot be directly transmitted to the component in the worker node, but first to a packet proxy service in the user cluster, and the packet proxy service finds a target component according to a preset virtual network strategy, and then forwards the packet to the target component. Therefore, in this way, the master node cannot directly communicate with the component in the worker node (such as Pod, Service, Kubelet, etc.).

In other words, in the above solution, since the master node of the user cluster operates in the worker node of the cluster provided by the service provider (the VPC of the service provider), while the worker node of the user cluster is deployed in the VPC of the user, the master node of the user cluster and the component in the worker node of the user cluster do not belong to the same network plane, as a result, the master node of the user cluster cannot communicate with the component in the worker node of the user cluster.

In order to solve the above problem, an embodiments of the present application provide a route updating method, which can be applied to a user cluster.

A master node of the user cluster operates in a worker node of a cluster provided by a service provider, and the user cluster further comprises at least one worker node. A BGP (Border Gateway Protocol) routing client operates in the worker node of the user cluster, while a BGP routing server operates in the master node, and a BGP connection exists between the BGP routing client and the BGP routing server.

When the BGP routing client detects that a new component is created by a worker node where the BGP routing client is located, the BGP routing client sends a route adding request corresponding to the created component to the BGP routing server, wherein the route adding request carries an IP (Internet Protocol) address of the created component, and an IP address of the worker node where the BGP routing client is located.

When a route adding request is received, the BGP routing server adds a route table entry including the IP address of the component and the IP address of the worker node where the BGP routing client is located to a local route table of the master node.

Based on the above processing, the master node can obtain routing information of the component in the worker node from the local route table, and then can communicate with the component in the worker node according to the routing information of the component.

Figure 1:
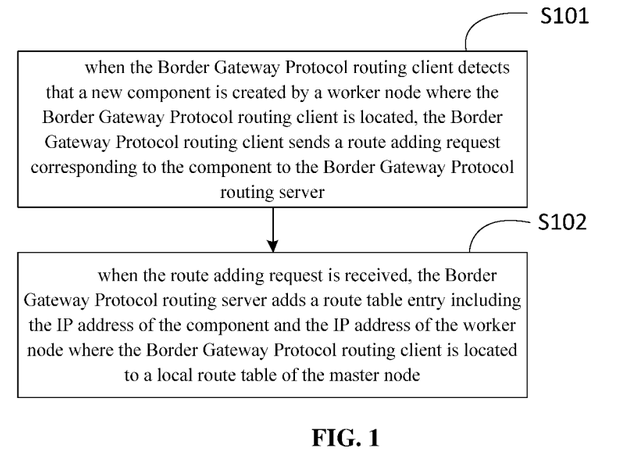
FIG. 1 is a flowchart of a route updating method provided by an embodiment of the present application.

Referring to FIG. 1, FIG. 1 is a flowchart of a route updating method provided by an embodiment of the present application, which can be applied to a user cluster.

A master node of the user cluster operates in a worker node of a cluster provided by a service provider, and the user cluster further comprises at least one worker node. A BGP routing client operates in the worker node of the user cluster, and a BGP routing server operates in the master node, and a BGP connection exists between the BGP routing client and the BGP routing server. The method may include the following step.

S101: when the BGP routing client (that is, the Border Gateway Protocol routing client) detects that a new component is created by a worker node where the BGP routing client is located, the BGP routing client sends a route adding request corresponding to the component to the BGP routing server (that is, the Border Gateway Protocol routing server).

The route adding request carries an IP address of the component and an IP address of the worker node where the BGP routing client is located.

For example, the BGP routing client in the worker node of the user cluster can be used to monitor update events of the component in the worker node where the BGP routing client is located, such as, the creation and deletion of the component, and to obtain the IP address of the component.

In one implementation, the BGP routing client may be a Kube-router. Kube-router is a network plug-in of Kubernetes clusters, which supports communication between the Pod components (container group, which is the smallest unit created, scheduled, and managed by Kurbernetes, a container group can be composed of multiple related containers that share disks, all containers in the container group are uniformly arranged and scheduled) and proxy service.

If Kube-router needs to be deployed in multiple worker nodes of the user cluster, Kube-router can be operated in the worker node of the user cluster in the manner of daemonset, and then Kube-router can be automatically operated as a Pod component in each of the worker nodes.

The BGP routing server may be the BGPD (Border Gateway Protocol Daemon) service initiated in the master node. For example, the BGP routing server may be an application or plug-in that can implement the BGP network protocol, such as the BGPD plug-in of the open source application Quagga, or open source applications such as GoBGP and Bird.

During the initialization of the user cluster, a BGP connection between the BGP routing server and the BGP routing client can be establish based on the BGP network protocol.

After the user cluster is initialized, the worker node may create different components according to business requirements.

In an embodiment, the worker node may create a Pod component or a Service component, and the created service component is used to support the user cluster to provide network services to the external.

The worker node may also assign IP addresses to the created components. Correspondingly, when the BGP routing client detects that a new component is created by the worker node, the BGP routing client may obtain the IP address assigned by the worker node to the created component and an IP address of the worker node, and sends a route adding request carrying the IP address of the component and the IP address of the worker node to the BGP routing server in the master node.

S102: when the route adding request is received, the BGP routing server adds a route table entry including the IP address of the component and the IP address of the worker node where the BGP routing client is located to a local route table of the master node.

In an embodiment of the present application, when the BGP routing server receives the route adding request sent by the BGP routing client through the BGP connection, it can obtain the IP address of the component and the IP address of the worker node carried in the route adding request, and then the BGP routing server can add a new route table entry (that is, the route table entry of the component) to the local route table of the master node. The added route table entry may include the IP address of the component and the IP address of the worker node where the component is located.

It can be seen that based on the route updating method provided by the embodiment of the present application, the master node may obtain routing information of the component in the worker node from the local route table, and then can communicate with the component in the worker node according to the routing information of the component.

In an embodiment, in order to improve the efficiency of maintaining the route table by the master node, the method may further include the following steps.

Step 1: when the BGP routing client detects that a component is deleted by the worker node where the BGP routing client is located, the BGP routing client sends a route deleting request corresponding to the component to the BGP routing server.

The route deleting request carries the IP address of the component and the IP address of the worker node where the BGP routing client is located.

In this embodiment, when a worker node deletes the created component according to business requirements, the BGP routing client in the worker node can detect the component deleted by the worker node, and determine the IP address of the deleted component, and then the BGP routing client may send the route deleting request including the IP address of the deleted component and the IP address of the worker node where the deleted component is located to the BGP routing server in the master node.

Step 2: when the route deleting request is received, the BGP routing server deletes the route table entry including the IP address of the deleted component and the IP address of the worker node where the BGP routing client is located from the local route table of the master node.

In this embodiment, when the BGP routing server receives the route deleting request sent by the BGP routing client through the BGP connection, it may obtain the IP address of the deleted component and the IP address of the worker node included in the route deleting request, and then the BGP routing server may determine a route table entry that matches both the obtained IP address of the component and the IP address of the worker node based on the local route table of the master node, and delete the determined route table entry from the route table.

It can be seen that based on the route updating method provided by the embodiment of the present application, when the worker node deletes the component, the master node can delete the route table entry corresponding to the component synchronously, so as to reduce the number of useless route table entries and improve the maintenance efficiency of the route table.

In an embodiment, the method may further include the following steps.

Step 1: when the BGP routing client detects that the IP address of the component is modified by the worker node where the BGP routing client is located, the BGP routing client sends a route modifying request corresponding to the component to the BGP routing server.

The route modifying request carries the original IP address of the component before modification, a target IP address of the component after modification, and the IP address of the worker node where the BGP routing client is located.

In this embodiment, when the worker node modifies the IP address of the created component according to business requirements, the BGP routing client in the worker node may detect the component with modified IP address, and determine the IP address of the component before modification (that is, the original IP address in the embodiment of this application) and the modified IP address (that is, the target IP address in the embodiment of this application), and then the BGP routing client may send the route modifying request including the original IP address, the target IP address, and the IP address of the worker node where the component is located to the BGP routing server in the master node.

Step 2: when the route modifying request is received, the BGP routing server determines a route table entry including the original IP address and the IP address of the worker node where the BGP routing client is located based on the local route table of the master node, and modifies the original IP address in the determined route table entry to the target IP address.

In this embodiment, when the BGP routing server receives the route modifying request sent by the BGP routing client through the BGP connection, it may obtain the original IP address, the target IP address, and the IP address of the worker node included in the route modifying request, and then the BGP routing server may determine a route table entry that matches both the original IP address and the IP address of the worker node based on the local route table of the master node, and modify the original IP address in the determined route table entry to the target IP address, and then the update of the routing information of the component is completed.

It can be seen that based on the route updating method provided by the embodiments of the present application, when the worker node modifies the IP address of the component, the master node may update the routing information of the component synchronously, thereby avoiding network service errors to a certain extent.

In an embodiment, the master node is mounted with an elastic network interface, and the elastic network interface belongs to a virtual private cloud where the worker node of the user cluster is located.

Correspondingly, the method may further include the following steps: component in the master node communicates with the component in the worker node of the user cluster through the elastic network interface based on the route table.

The elastic network interface belongs to the virtual private cloud where the worker node of the user cluster is located, that is, the IP address of the elastic network interface belongs to the subnet segment of the virtual private cloud where the worker node of the user cluster is located.

In one implementation, the master node of the user cluster may operate in the form of a Pod component (can be called the master node Pod) in the worker node (can be called the target worker node) of the cluster provided by the server, and the elastic network interface may be hot-swappable on the target worker node, and may be mounted to the master node Pod.

Correspondingly, because the routing information of the component in the worker node is recorded in the local route table of the master node, the component in the master node may communicate with the component in the worker node of the user cluster through the elastic network interface mounted to the master node based on the route table.

In one implementation, a next hop in the route table entry corresponding to the component in the worker node may be the IP address of the worker node where it is located. Correspondingly, the component in the master node may send a request data packet to the worker node corresponding to the next hop through the elastic network interface, and then after receiving a request message for the request data packet, the worker node may send the request data packet to the worker component.

For example, the Kubernetes cluster system service kube-apiserver in the master node may access the Pod component based on the route table entry of the Pod component in the worker node, to obtain operation log of the Pod component, status information of the worker node where the Pod component is located, etc., or, may also access the Service component in the worker node to obtain the information related to the network service provided by the worker node where the Service component is located.

Figure 2:
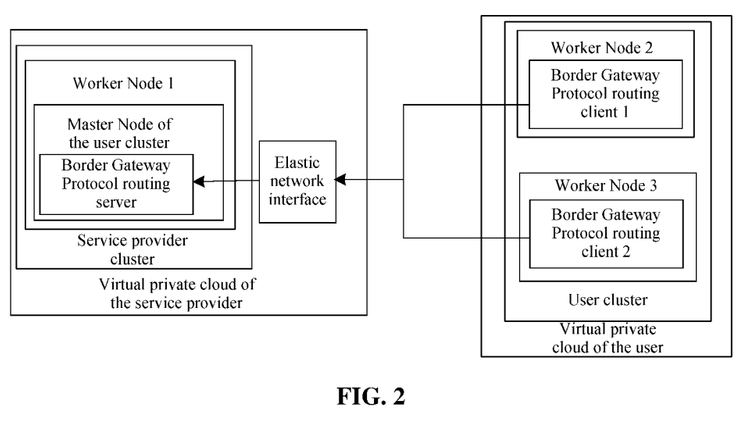
FIG. 2 is an architecture diagram of a networking provided by an embodiment of the present application.

Referring to FIG. 2, an architecture diagram of a networking provided by an embodiment of the present application.

In FIG. 2, a master node of a user cluster operates in a worker node 1 of a cluster provided by a server in a virtual private cloud of service provider (i.e., service provider cluster). A Border Gateway Protocol routing server operates in the master node of the user cluster.

A user cluster in a virtual private cloud of the user includes a worker node 2 and a worker node 3. A Border Gateway Protocol routing client 1 operates in the worker node 2, and a Border Gateway Protocol routing client 2 operates in the worker node 3.

The IP address of the elastic network interface belongs to the subnet segment of the virtual private cloud of the user and is mounted to the master node of the user cluster.

The master node of the user cluster operates in the worker node 1 of the cluster provided by the server (that is, the service provider cluster). The Border Gateway Protocol routing server operates in the master node of the user cluster. The Border Gateway Protocol routing server establishes a BGP connection with the Border Gateway Protocol routing client 1 and the Border Gateway Protocol routing client 2 respectively through an elastic network interface.

For example, the Border Gateway Protocol routing client 1 can synchronize the routing information of newly created components, the routing information of deleted components, and the modified routing information in the worker node 2 to the Border Gateway Protocol routing server. The Border Gateway Protocol routing server may update the local route table of the master node of the user cluster based on the received routing information, so that the component in the master node of the user cluster can communicate with the component in the worker node 2 based on the route table entry corresponding to the component recorded in the route table.

Figure 3:
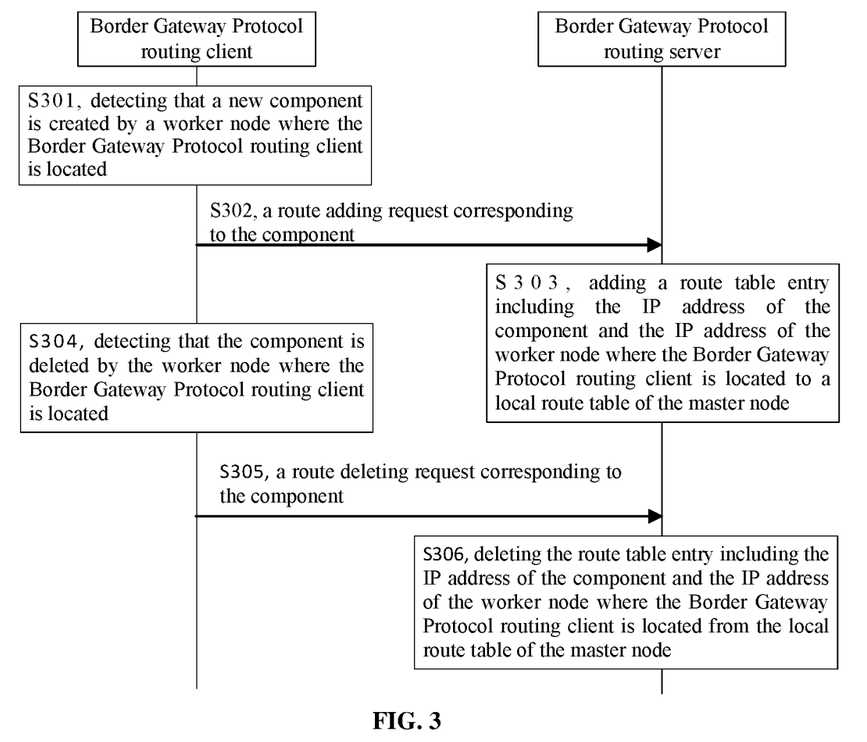
FIG. 3 is a flowchart of an example of a route updating method provided by an embodiment of the present application.

Referring to FIG. 3, a flowchart of an example of a route updating method provided by an embodiment of the present application. The method is applied to a user cluster. A master node of the user cluster operates in a worker node of a cluster provided by a service provider. The user cluster further comprises at least one worker node, a BGP routing client (i.e., Border Gateway Protocol routing client) operates in the worker node of the user cluster, a BGP routing server (i.e., Border Gateway Protocol routing server) operates in the master node, a BGP connection exists between the BGP routing client and the BGP routing server. The method may include the following steps.

S301: the Border Gateway Protocol routing client detects that a new component is created by a worker node where the Border Gateway Protocol routing client is located.

S302: the Border Gateway Protocol routing client sends a route adding request corresponding to the component to the Border Gateway Protocol routing server.

The route adding request carries an IP address of the component and an IP address of the worker node where the Border Gateway Protocol routing client is located.

S303: the Border Gateway Protocol routing server adds a route table entry including the IP address of the component and the IP address of the worker node where the Border Gateway Protocol routing client is located to a local route table of the master node.

S304: the Border Gateway Protocol routing client detects that the component is deleted by the worker node where the Border Gateway Protocol routing client is located.

S305: the Border Gateway Protocol routing client sends a route deleting request corresponding to the component to the Border Gateway Protocol routing server.

The route deleting request carries the IP address of the component and the IP address of the worker node where the Border Gateway Protocol routing client is located.

S306: the Border Gateway Protocol routing server deletes the route table entry including the IP address of the component and the IP address of the worker node where the Border Gateway Protocol routing client is located from the local route table of the master node.

The following illustrate the application scenarios through examples.

In one case, the master node of the user cluster may operate in the worker node of the cluster provided by the service provider, and the service provider is responsible for the management and maintenance of the master node. The worker node of the user cluster is a virtual machine or a physical machine in the VPC of user, and the master node overlies on the VPC.

A BGP routing client operates in the virtual or physical machine in the VPC of user, and a BGP routing server operates in the master node overlying on the VPC. A BGP connection exists between the BGP routing client and the BGP routing server.

When a new component, such as a Pod component or a Service component, is created in the virtual or physical machine in the VPC of the user, the IP address of the new component can be sent to the master node overlying on the VPC through the BGP connection between the BGP routing client and the BGP routing server, the master node adds a route table entry including the IP address of the new component and the IP address of the virtual machine or physical machine where the new component is located to its local route table. In this way, the master node can hop to the virtual machine or physical machine in the VPC of the user through the elastic network interface according to its local route table, and access the new component created in the virtual machine or physical machine.

In addition, in the case that the virtual machine or physical machine in the VPC of the user deletes a component or modifies the IP address of the component, the route table entry in the local route table of the master node may be deleted or modified through the BGP connection between the BGP routing client and the BGP routing server. Refer to the content in the above embodiments, which will not be repeated here.

Based on the same inventive concept, an embodiment of the present application also provides a user cluster, a master node of the user cluster operates in a worker node of a cluster provided by a service provider, and the user cluster further comprises at least one worker node, a Border Gateway Protocol BGP routing client operates in the worker node of the user cluster, a BGP routing server operates in the master node, and a BGP connection exists between the BGP routing client and the BGP routing server, wherein:

the BGP routing client is configured to send a route adding request corresponding to a new component to the BGP routing server when detecting that the component is created by the worker node where the BGP routing client is located, wherein the route adding request carries an Internet Protocol IP address of the component, and an IP address of the worker node where the BGP routing client is located;

the BGP routing server is configured to, when the route adding request is received, add a route table entry including the IP address of the component and the IP address of the node where the BGP routing client is located to a local route table of the master node.

In an embodiment, the BGP routing client is further configured to send a route deleting request corresponding to the component to the BGP routing server when the BGP routing client detects that the component is deleted by the worker node where the BGP routing client is located, wherein the route deleting request carries the IP address of the component and the IP address of the worker node where the BGP routing client is located;

the BGP routing server is further configured to, when the route deleting request is received, delete the route table entry including the IP address of the component and the IP address of the worker node where the BGP routing client is located from the local route table of the master node.

In an embodiment, the BGP routing client is further configured to send a route modifying request corresponding to the component to the BGP routing server when the BGP routing client detects that the IP address of the component is modified by the worker node where the BGP routing client is located, wherein the routing modifying request carries the original IP address of the component before modification, a target IP address of the component after modification, and the IP address of the worker node where the BGP routing client is located.

The BGP routing server is further configured to, when the route modifying request is received, determine a route table entry including the original IP address of the component and the IP address of the worker node where the BGP routing client is located based on the local route table of the master node, and modifies the original IP address in the determined route table entry to the target IP address.

In an embodiment, the master node is mounted with an elastic network interface, and the elastic network interface belongs to a virtual private cloud where the worker node of the user cluster is located;

and component in the master node communicates with the component in the worker node of the user cluster through the elastic network interface based on the route table.

In an embodiment, the component includes a container group Pod component and a Service component.

It can be seen that, based on the user cluster provided by the embodiment of the present application, the master node may obtain routing information of the component in the worker node from the local route table, and then can communicate with the component in the worker node according to the routing information of the component.

In another embodiment provided by the present application, a computer program product including instructions is also provided, which when running on a computer, causes the computer to execute any one route updating method in the above embodiments.

In another embodiment provided by the present application, an executable program is also provided, and the executable program is configured to be run to execute any one route updating method in the above embodiments.

It should be noted that the relationship terms used herein such as "first", "second", and the like are only for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. In particular, the embodiments of the user cluster, the computer readable storage medium and the computer program product are described briefly since they are substantially similar to the method embodiment, and the related parts can be referred to the corresponding description of the method embodiment.

The foregoing descriptions are only preferred embodiments of the present application, and are not intended to limit the protection scope of the present application. Any modification, equivalent replacement, improvement, etc.

within the spirit and principle of the present application shall be included in the protection scope of the present application.

INDUSTRIAL APPLICABILITY

The present application provides a route updating method and a user cluster, a master node of the user cluster operates in a worker node of the cluster provided by a service provider, the user cluster further comprises at least one worker node, a BGP routing client operates in the worker node of the user cluster, a BGP routing server operates in the master node, and a connection between the BGP routing client and the BGP routing server is established based on the BGP network protocol. When the BGP routing client detects that a new component is created by a worker node where the BGP routing client is located, the BGP routing client may send a route adding request corresponding to the component to the BGP routing server. The BGP routing server adds a route table entry including the IP address of the component and the IP address of the worker node where the BGP routing client is located to a local route table of the master node when a route adding request is received. Based on the above processing, the master node may obtain routing information of the component in the worker node from the local route table, and then can communicate with the component in the worker node according to the routing information of the component.

What is claimed is:

1. A route updating method, which is applied to a user cluster, a master node of the user cluster operates in a worker node of a cluster provided by a service provider, the user cluster comprises at least one worker node in which a Border Gateway Protocol BGP routing client operates, a BGP routing server operates in the master node, and a BGP connection exists between the BGP routing client and the BGP routing server; the method comprises:
when the BGP routing client detects that a new component is created by a worker node where the BGP routing client is located, the BGP routing client sends a route adding request corresponding to the component to the BGP routing server, wherein the route adding request carries an Internet Protocol IP address of the component and an IP address of the worker node where the BGP routing client is located;
when the route adding request is received, the BGP routing server adds a route table entry including the IP address of the component and the IP address of the worker node where the BGP routing client is located to a local route table of the master node.

2. The method according to claim 1, wherein after the BGP routing client sends a route adding request corresponding to the component to the BGP routing server, the method further comprises:
when the BGP routing client detects that the component is deleted by the worker node where the BGP routing client is located, the BGP routing client sends a route deleting request corresponding to the component to the BGP routing server, wherein the route deleting request carries the IP address of the component and the IP address of the worker node where the BGP routing client is located;
when the route deleting request is received, the BGP routing server deletes the route table entry including the IP address of the component and the IP address of the worker node where the BGP routing client is located from the local route table of the master node.

3. The method according to claim 1, wherein after the BGP routing client sends a route adding request corresponding to the component to the BGP routing server, the method further comprises:
when the BGP routing client detects that the IP address of the component is modified by the worker node where the BGP routing client is located, the BGP routing client sends a route modifying request corresponding to the component to the BGP routing server, wherein the routing modifying request carries the original IP address of the component before modification, a target IP address of the component after modification, and the IP address of the worker node where the BGP routing client is located;
when the route modifying request is received, the BGP routing server determines a route table entry including the original IP address and the IP address of the worker node where the BGP routing client is located based on the local route table of the master node, and modifies the original IP address in the determined route table entry to the target IP address.

4. The method according to claim 1, wherein the master node is mounted with an elastic network interface that belongs to a virtual private cloud where the worker node of the user cluster is located;
the method further comprises:
a component in the master node communicates with the component in the worker node of the user cluster through the elastic network interface based on the route table.

5. The method according to claim 1, wherein the component includes a container group Pod component and a Service component.

6. A non-transitory computer-readable storage medium having stored thereon a machine-executable instruction which, when called and executed by a processor, causes the processor to carry out the method of claim 1.

7. A user cluster, wherein a master node of the user cluster operates in a worker node of a cluster provided by a service provider, the user cluster comprises at least one worker node in which a Border Gateway Protocol BGP routing client operates, a BGP routing server operates in the master node, and a BGP connection exists between the BGP routing client and the BGP routing server, wherein:
the BGP routing client is configured to send a route adding request corresponding to a new component to the BGP routing server when the BGP routing client detects that the component is created by a worker node where the BGP routing client is located, wherein the route adding request carries an Internet Protocol IP address of the component and an IP address of the worker node where the BGP routing client is located;
the BGP routing server is configured to, when a route adding request is received, add a route table entry including the IP address of the component and the IP address of the worker node where the BGP routing client is located to a local route table of the master node.

8. The user cluster according to claim 7, wherein the BGP routing client is further configured to send a route deleting request corresponding to the component to the BGP routing server when the BGP routing client detects that the component is deleted by the worker node where the BGP routing client is located, wherein the route deleting request carries the IP address of the component and the IP address of the worker node where the BGP routing client is located;

the BGP routing server is further configured to, when the route deleting request is received, delete the route table entry including the IP address of the component and the IP address of the worker node where the BGP routing client is located from the local route table of the master node.

9. The user cluster according to claim 7, wherein the BGP routing client is further configured to send a route modifying request corresponding to the component to the BGP routing server when the BGP routing client detects that the IP address of the component is modified by the worker node where the BGP routing client is located, wherein the routing modifying request carries the original IP address of the component before modification, a target IP address of the component after modification, and the IP address of the worker node where the BGP routing client is located;

the BGP routing server is further configured to, when the route modifying request is received, determine a route table entry including the original IP address and the IP address of the worker node where the BGP routing client is located based on the local route table of the master node, and modify the original IP address in the determined route table entry to the target IP address.

10. The user cluster according to claim 7, wherein the master node is mounted with an elastic network interface that belongs to a virtual private cloud where the worker node of the user cluster is located;

a component in the master node communicates with the component in the worker node of the user cluster through the elastic network interface based on the route table.

11. The user cluster according to claim 7, wherein the component includes a container group Pod component and a Service component.

* * * * *